United States Patent [19]
Rosaen

[11] 3,970,566
[45] July 20, 1976

[54] FLUID FILTERING DEVICE
[75] Inventor: Borje O. Rosaen, Ann Arbor, Mich.
[73] Assignee: Dale P. Fosdick, Ann Arbor, Mich.; a part interest
[22] Filed: Nov. 20, 1974
[21] Appl. No.: 525,739

[52] U.S. Cl.............................. 210/452; 210/454; 210/457
[51] Int. Cl.² ........................................ B01D 27/00
[58] Field of Search ........... 210/172, 232, 416, 452, 210/454, 457

[56] References Cited
UNITED STATES PATENTS

| | | | |
|---|---|---|---|
| 1,175,948 | 3/1916 | French | 210/454 X |
| 1,223,299 | 4/1917 | Taylor | 210/452 |
| 2,363,009 | 11/1944 | Lewis | 210/454 |
| 3,006,478 | 10/1961 | Mueller | 210/454 X |

Primary Examiner—Charles N. Hart
Assistant Examiner—Richard W. Burks
Attorney, Agent, or Firm—Gifford, Chandler & Sheridan

[57] ABSTRACT

A fluid filtering device utilizing a standard or conventional tee connector and a standard or conventional pipe as the housing. A filter assembly is threadably received in one end of the tee connector and carries a filter element which extends into the pipe.

3 Claims, 7 Drawing Figures

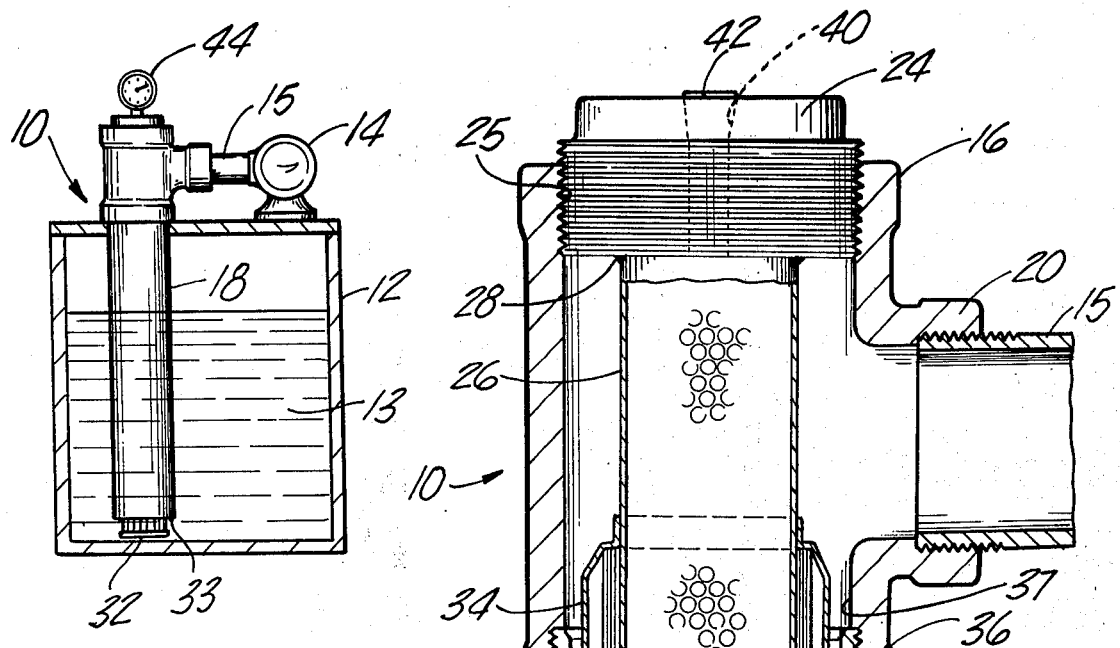
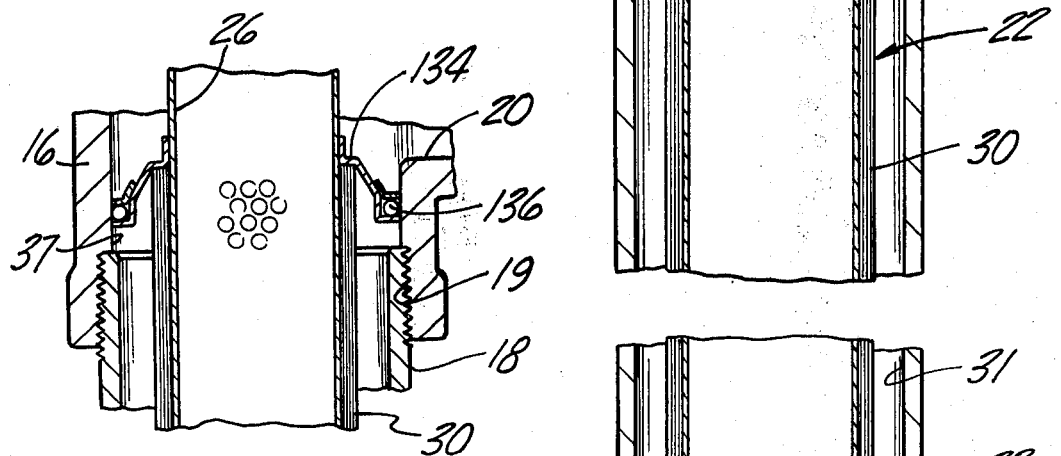
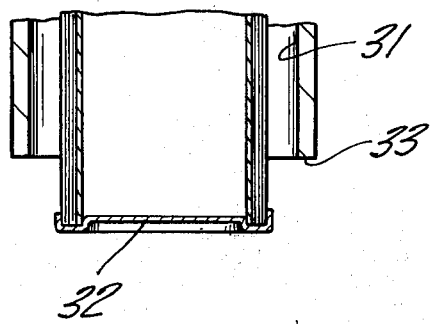

1

FLUID FILTERING DEVICE

BACKGROUND OF THE INVENTION

I. Field of the Invention

The present invention relates to filter devices and more particularly to such a device utilizing a standard or conventional tee connector and a standard or conventional pipe as the housing.

II. Description of the Prior Art

Filter devices have heretofore been constructed of relatively expensive housing members. Further, generally such filter devices have not been constructed so that they are capable of use as either a suction line or a return line filter.

SUMMARY OF THE INVENTION

The present invention is directed to a filter device which utilizes a standard or conventional tee connector and a standard or conventional pipe either as the housing or as a part thereof. A filter assembly is threadably received in one end of the tee connector and carries a filter element which is disposed within the pipe. The open end of the pipe comprises the inlet for the filter device while the side opening of the tee connector comprises the outlet.

In a suction line application the open end of the pipe extends into a fluid reservoir below the liquid level therein with the side opening of the tee connector adapted for connection to a pump. In this arrangement it is preferred that the filter assembly be mounted by screws or the like to a port member which can be permanently threaded into the open end of the tee connector. This reduces the possibility of the piping between the filter device and the pump being loosened when the filter assembly is removed for cleaning or replacement.

In a return line application the side opening of the tee connector is utilized to return fluid to the reservoir while the end of the pipe is threaded and is connected by suitable piping to the pump.

BRIEF DESCRIPTION OF THE DRAWINGS

The present invention is illustrated in the accompanying drawings, wherein like numerals refer to like parts throughout the several views, and in which:

FIG. 1 is an elevation view, partially in cross section, of the filter device of the invention being utilized as a suction line filter;

FIG. 2 is an enlarged cross-sectional view of the filter device of FIG. 1;

FIG. 3 is a fragmentary cross-sectional view showing a preferred modification of the filter device shown in FIG. 2;

DETAILED DESCRIPTION OF THE PREFERRED EMBODIMENTS OF THE INVENTION

Figure 4:
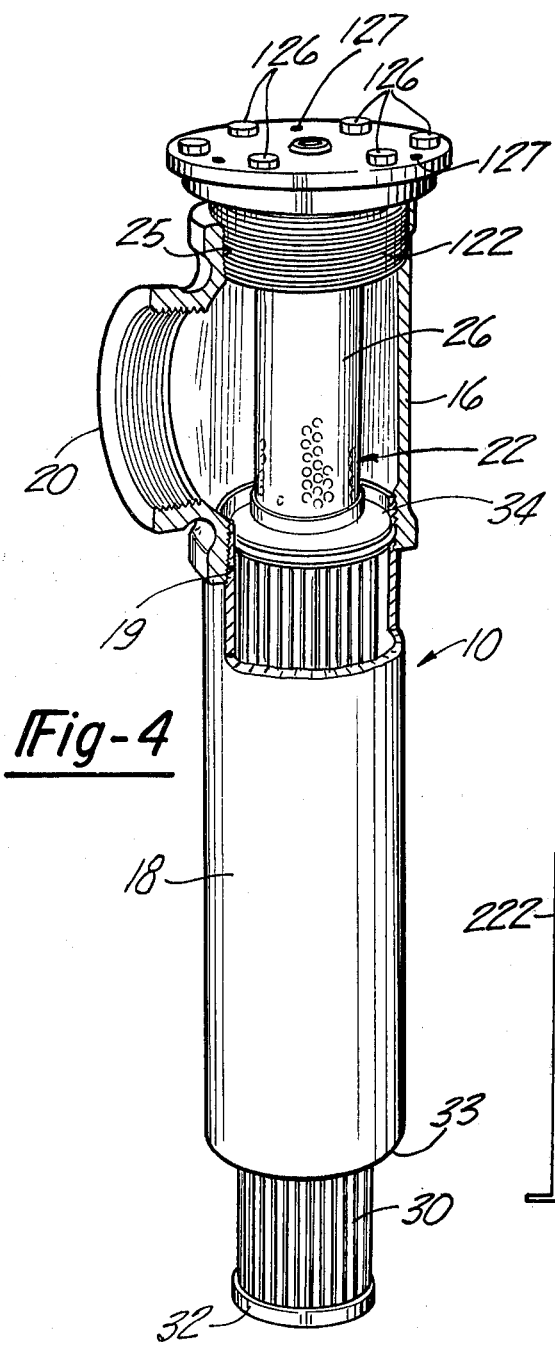
FIG. 4 is a perspective view, partially in section, of another preferred embodiment of the present invention.

Now referring to the drawings for a more detailed description of the present invention, FIG. 1 illustrates a filter device 10 constructed in accordance with the invention and utilized in a suction line application.

The filter device 10 extends into a fluid reservoir 12 with its open lower end below the level of the liquid 13 contained therein. A pump 14 is connected to the outlet side of the filter device 10 by suitable piping 15 so that the filter device 10 filters the fluid as it is pumped through the device from the reservoir 12 by the pump 14.

As can best be seen in FIG. 2, the filter device 10 preferably comprises a conventional or standard tee fitting 16 and a conventional or standard pipe 18 threadably received in the lower end 19 of the tee fitting 16. The open side portion 20 of the tee fitting 16 forms the outlet of the filter device 10 and threadably receives the piping 15 for connection to the pump 14.

While it has been preferred to describe the tee fitting 16 as having but one side opening 20, it should be understood that it could, if desired, take the form of a cross fitting with a pair of oppositely positioned side openings. In such a construction the extra side opening 20 would either be plugged or could be connected to another pump. When the word "tee fitting" is used in this application it is intended to encompass such cross fittings as well.

A filter assembly 22 is removably mounted within the tee fitting 16 and the pipe 18 and comprises a cap member 24 threadably received in the internally threaded open upper end 25 of the tee fitting 16. A perforated, cylindrical inner member 26 is mounted to the inner surface of the cap member 24, preferably by welding or the like, as at 28, and extends coaxially through the interior of the tee fitting 16 and the pipe 18. A cylindrical filter element 30 is mounted to the lower end of the perforated member 26 and is closed at its lower end by an end cap 32. The filter element 30 is radially inwardly spaced from the inner wall 31 of the pipe 18 as can best be seen in FIG. 2.

The lower end of the filter assembly 22 can extend below the end 33 of the pipe 18 as shown in FIGS. 1 and 2, as long as the lower end of the pipe 18 is below the liquid level of the reservoir 12.

The filter assembly 22 further comprises a resilient flange member 34 mounted to the perforated member 26 above the filter element 30 to sealingly engage the inner wall 31 of the pipe 18 to thereby direct fluid flow inwardly through the filter element 30. An O-ring seal 36 is preferably carried at the outer edge of the flange member 34 for this purpose.

FIG. 3 illustrates a preferred modification in which a flange member 134 mounted to the perforated member 26 carries an O-ring seal 136 which engages the inner wall 37 of the tee fitting 16 below the side opening 20.

A threaded opening 40 may be provided in the cap member 24. The opening 40 can be closed by a plug 42 as shown in FIG. 2 or it can provide the means for attaching a pressure gauge 44 to the filter device 10 as shown in FIG. 1.

The filter device 10 illustrated in FIGS. 1–3 is intended for use as a suction line filter. Fluid is thus drawn from the reservoir 12 into the open lower end 33 of the pipe 18. The flange members 34–134 prevent direct flow to the side opening 20 of the tee fitting 16 so that the fluid flows radially inwardly through the filter element 30 and the perforated tube 26, axially upwardly through the tube 26, radially outwardly through the tube 26 and to the outlet of the device formed by the side opening 20 of the tee fitting 16.

The pressure gauge 44, if used, will indicate the degree of clogging of the filter element 30 and when the element 30 becomes unduly clogged it can be readily removed for cleaning or replacement by removing the cap member 24.

Figure 5:
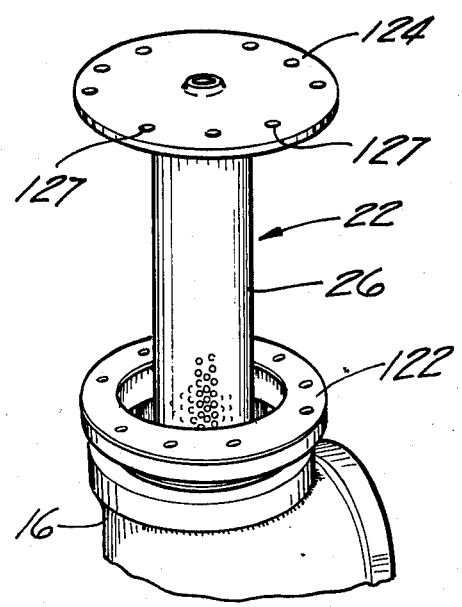
FIG. 5 is a fragmentary view of a portion of the structure illustrated in FIG. 4 with parts disassembled for purposes of clarity.

FIGS. 4-5 illustrate an embodiment similar to the embodiment of FIGS. 1-3 but in which the cap member 24 has been modified. An open center port member 122 is threadably received in the open upper end 25 of the tee fitting 16 and is designed to remain there. A cap member 124 is mounted to the port member 122 by screws 126. The cap member 124 is a part of the filter assembly 22 so that the tubular perforated member 26 is secured to the cap member 124. Upon loosening the screws 126, the filter assembly 22 is removable through the port member 122 in the manner illustrated in FIG. 5.

It should be noted that the cap member 124 has more apertures 127 for the screws 126 than does the port member 122 (see FIG. 4). This permits the screws 126 to be removed and then to be screwed into an aperture 127 which does not have an aligning aperture in the port member 122. The screws 126 so tightened act as jacks to break the seal between the cap member 124 and the port member 122.

The assembly of FIGS. 4-5 has the advantage that removal of the filter assembly 22 does not require relative turning between the cap member 122 and the tee fitting 16. Such turning can, if care is not exercised, result in the piping 15 between the tee fitting 16 and the pump 14 being twisted out of line. Further, it is much easier to seal the joint between the cap member 124 and the port member 122 than it is to seal a pipe plug.

Figure 6:
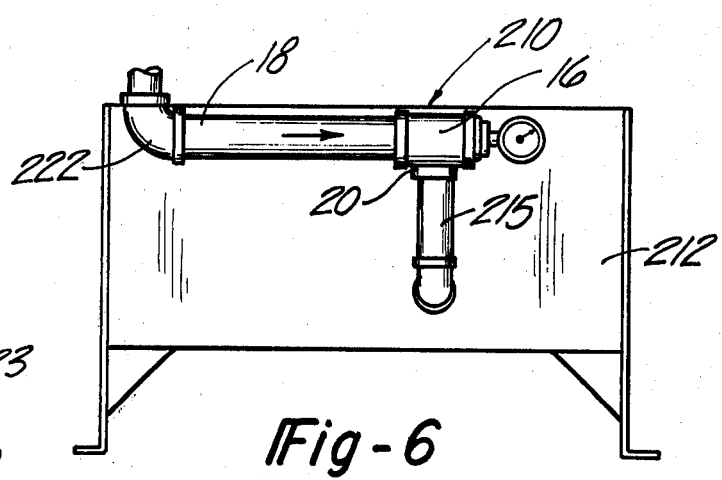
FIG. 6 is a diagrammatic illustration of the filter device of the present invention being utilized as a return line filter.
Figure 7:
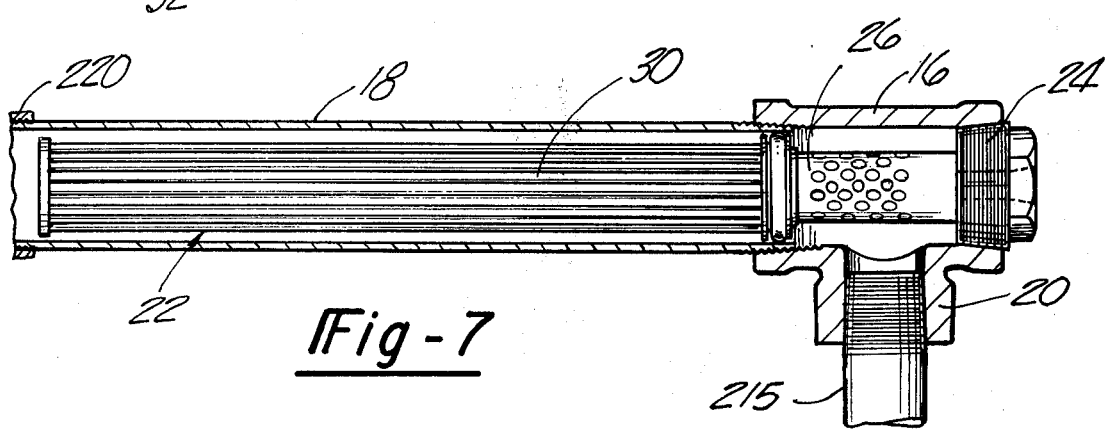
FIG. 7 is a cross-sectional view of the filter device illustrated in FIG. 6.

FIGS. 6-7 illustrate a preferred filter device 210 of the present invention mounted for use in a return line system.

As illustrated in FIG. 6 the filter device 210 is mounted to an interior side of a reservoir 212 by suitable piping 215. The filter device 210 is similar to the device 10 of FIGS. 1-3 except that the end of the pipe 18 is suitably threaded as at 220 (FIG. 7) to receive piping 222.

A pump (not shown) directs fluid through the piping 222 into the filter device 210 where it is filtered in the manner described with respect to the device of FIGS. 1-3 and is then returned to the reservoir 212 through the outlet formed by the side portion 20 of the tee fitting 16 and by the piping 215 connected thereto.

It is apparent that in each embodiment described the filter device is constructed utilizing a conventional tee fitting and a conventional piece of pipe as the filter housing. This not only substantially reduces the cost of assemblying such a filter device, since it eliminates the high cost of casting or otherwise forming the housing, but it also provides a filter device which can be assembled into a system using conventional plumbing or piping techniques.

It is also apparent that although I have described several embodiments of the present invention many other changes and modifications can be made therein without departing from the spirit of the present invention.

I claim:

1. In combination with a conventional tee fitting, said tee fitting having internally threaded openings at each end and an internally threaded side opening intermediate said end openings, a first conventional pipe having an externally threaded end received by one of said end openings, a second conventional pipe having an externally threaded end received by said side opening, a filter device to be mounted in said conventional tee fitting comprising a cap member adapted to be mounted to the free end opening of said tee fitting, a perforated, tubular member secured at one end to said cap member so that said tubular member extends axially through said tee fitting, and across said side opening so that the free end of said tubular member is positioned on the opposite transverse side of said side opening from the cap member, a hollow filter element secured to the free end of said perforated tubular member below said side opening wherein said filter element is in axial alignment with said tubular member so that said filter element extends axially into said first pipe and wherein said filter element is spaced radially inward from said first pipe, so that fluid flows from the exterior of said filter element to the interior of said filter element, up through said perforated tubular member and into said tee fitting, whereby said filter element is removed from said first pipe through said tee fitting in unison with the removal of said cap member and said perforated, tubular member.

2. The combination as defined in claim 1, and including a circular flange member carried by said tubular member and engaging the inner wall of said first pipe at a point intermediate the filter element and said side opening of said tee fitting and sealing means around the outer periphery of said flange member for providing a sealing engagement between said flange member and said first pipe.

3. The combination as defined in claim 1, and including a circular flange member carried by said tubular member and engaging the inner wall of said tee fitting at a point intermediate the filter element and said side opening of said tee fitting and sealing means around the outer periphery of said flange member for providing a sealing engagement between said flange member and said tee fitting.

* * * * *